(12) United States Patent
Saito et al.

(10) Patent No.: US 8,893,892 B2
(45) Date of Patent: Nov. 25, 2014

(54) APPARATUS AND METHOD FOR REMOVING UNBURNED CARBON FROM FLY ASH

(75) Inventors: Shinichiro Saito, Kumagaya (JP); Kazuo Abe, Nerima-ku (JP); Kazuyoshi Matsuo, Chiba (JP)

(73) Assignee: Taiheiyo Cement Corporation, Tokyo (JP)

( * ) Notice: Subject to any disclaimer, the term of this patent is extended or adjusted under 35 U.S.C. 154(b) by 1115 days.

(21) Appl. No.: 12/096,333

(22) PCT Filed: Nov. 28, 2006

(86) PCT No.: PCT/JP2006/323656
§ 371 (c)(1),
(2), (4) Date: Feb. 23, 2009

(87) PCT Pub. No.: WO2007/066534
PCT Pub. Date: Jun. 14, 2007

(65) Prior Publication Data
US 2009/0308794 A1 Dec. 17, 2009

(30) Foreign Application Priority Data
Dec. 7, 2005 (JP) .................................. 2005-353097

(51) Int. Cl.
*B03D 1/02* (2006.01)
(Continued)

(52) U.S. Cl.
CPC ............... *B03D 1/02* (2013.01); *B01F 5/0612* (2013.01); *B01F 5/0614* (2013.01);

(58) Field of Classification Search
CPC ........................................................ B03D 1/02
USPC .................................. 209/164, 168, 169, 170
See application file for complete search history.

(56) References Cited
U.S. PATENT DOCUMENTS
3,446,353 A * 5/1969 Nankivell ..................... 209/164
3,747,757 A * 7/1973 Kalthoff et al. ............... 209/164
(Continued)

FOREIGN PATENT DOCUMENTS
DE 3641940 A1 * 6/1988
EP 0 829 305 A2 3/1998
(Continued)

OTHER PUBLICATIONS
Toshiaki Murata, "Coal Preparation Technology for Moderation of Environmental Pollution," Journal "Doryoku (Power)" No. 248 extra issue, 1998.
(Continued)

*Primary Examiner* — Thomas M Lithgow
(74) *Attorney, Agent, or Firm* — Stetina Brunda Garred & Brucker

(57) ABSTRACT

An apparatus and a method for removing unburned carbon from fly ash capable of suppressing facility cost and stably conducting performance adjustment depending on property of the fly ash. The method comprises the steps of: adding water to fly ash to produce slurry; adding collector to the slurry, feeding the slurry and the collector to a static-type mixer 4, a venturi pipe 24 or the like to add shearing force to them; adding frother to them to generate air bubbles; and adhering unburned carbon of the fly ash to the air bubbles to raise the unburned carbon. The frother and air can be fed to the static-type mixer or the like together with the slurry and the collector. Depending on the change in property of the fly ash, the number of the static-type mixers or the like used in series can be increased or decreased, and depending on required capacity, the number of the static-type mixers or the like used in parallel may be increased or decreased. The static-type mixer may comprise a guide vane chamber 4b with plurality of guide vanes 4d for converting the slurry and the like, which are fed to the chamber, to spiral flow, and a current cutter chamber 4c with plurality of mushroom-shaped projections 4e for adding shearing force to the slurry and the like.

17 Claims, 4 Drawing Sheets

(a)

(51) Int. Cl.
  *B03D 1/14* (2006.01)
  *B03D 1/24* (2006.01)
  *B01F 5/06* (2006.01)
  *C04B 18/08* (2006.01)

(52) U.S. Cl.
  CPC .............. *C04B 18/08* (2013.01); *B03D 1/14* (2013.01); *B03D 1/247* (2013.01); *B01F 2005/0621* (2013.01); *B01F 2005/0636* (2013.01)
  USPC ........................... 209/164; 209/168; 209/170

(56) References Cited

U.S. PATENT DOCUMENTS

| | | | |
|---|---|---|---|
| 4,448,681 A * | 5/1984 | Ludke et al. | 210/97 |
| 4,534,862 A * | 8/1985 | Zlokarnik | 210/221.2 |
| 4,540,484 A | 9/1985 | McCarthy | |
| 4,861,165 A * | 8/1989 | Fredriksson et al. | 366/165.1 |
| 4,952,308 A * | 8/1990 | Chamberlin et al. | 209/170 |
| 4,981,582 A | 1/1991 | Yoon et al. | |
| 5,096,572 A * | 3/1992 | Hwang | 209/164 |
| 5,167,798 A * | 12/1992 | Yoon et al. | 209/170 |
| 5,431,286 A * | 7/1995 | Xu et al. | 209/170 |
| 5,741,466 A * | 4/1998 | Bodnaras | 422/228 |
| 5,855,769 A * | 1/1999 | Firth et al. | 209/164 |
| 2007/0199486 A1 | 8/2007 | Saito et al. | |

FOREIGN PATENT DOCUMENTS

| | | | |
|---|---|---|---|
| JP | 5344472 | | 4/1978 |
| JP | 5386720 | | 7/1978 |
| JP | 63104668 A * | | 5/1988 |
| JP | 2116649 | | 5/1990 |
| JP | 3221147 | | 9/1991 |
| JP | 5238788 | | 9/1993 |
| JP | 5293385 | | 11/1993 |
| JP | 6157089 | | 6/1994 |
| JP | 6335700 | | 6/1994 |
| JP | 06063335 | | 8/1994 |
| JP | 775720 | | 3/1995 |
| JP | 7204604 | | 8/1995 |
| JP | 7213950 | | 9/1995 |
| JP | 7299331 | | 11/1995 |
| JP | 8108038 | | 4/1996 |
| JP | 9227184 | | 9/1997 |
| JP | 09295841 | | 11/1997 |
| JP | 9301751 | | 11/1997 |
| JP | 10230137 | | 9/1998 |
| JP | 11010131 | | 1/1999 |
| JP | 11100243 | | 4/1999 |
| JP | 11244826 | | 9/1999 |
| JP | 11347548 | | 12/1999 |
| JP | 200024625 | | 1/2000 |
| JP | 2000146458 | | 5/2000 |
| JP | 2001198434 | | 7/2001 |
| JP | 2002180146 | | 6/2002 |
| JP | 2002219335 | | 8/2002 |
| JP | 2002282639 | | 10/2002 |
| JP | 2002355531 | | 12/2002 |
| JP | 3613347 B1 * | | 1/2005 |
| JP | 2005104792 | | 4/2005 |
| WO | 2005/035134 A1 | | 4/2005 |

OTHER PUBLICATIONS

Mitsui Engineering & Shipbuilding Co., Ltd "De-Ashing and De-Sulfurizing Equipment Based on M-COL Technology," Journal, No. 154, 1995.

Mitsui Engineering & Shipbuilding Co., Ltd., "Fine M-COL," Journal, No. 170, 2000.

Mitsui Engineering & Shipbuilding Co., Ltd., "Development of Clean Coal Fuel (M-COL) System," Journal, No. 171, 2000.

Nishitani, Takashi, "A Basic Experiment on the Mercury Removal in Exhaust Gases from Municipal Refuse Incinerator," Osaka City Institute of Public Health and Environmental Sciences, Annual Report No. 51, 1988.

Extended/Supplementary European Search Report for Patent Application No. 06833460.6 (PCT/JP2006323656). Apr. 30, 2013; 6 pages.

* cited by examiner (a)

(b)

APPARATUS AND METHOD FOR REMOVING UNBURNED CARBON FROM FLY ASH

CROSS-REFERENCE TO RELATED APPLICATIONS

The present application claims priority to International Application No. PCT/JP2006/323656 which was filed on Nov. 28, 2006 and claims priority to Japanese Patent Application No. 2005-353097 filed Dec. 7, 2005.

STATEMENT RE: FEDERALLY SPONSORED RESEARCH/DEVELOPMENT

Not Applicable

BACKGROUND OF THE INVENTION

1. Technical Field of the Invention

The present invention relates to an apparatus and a method for removing unburned carbon from fly ash, and more particularly to an apparatus and a method for efficiently removing unburned carbon from fly ash generated in coal firing power plants and so on, and effectively using the removed unburned carbon and the fly ash from which unburned carbon is removed.

2. Description of the Related Art

Fly ash generated in coal firing power plants etc. is used for materials for cement and artificial lightweight aggregates, concrete admixture, etc. However, when fly ash is used as concrete admixture, unburned carbon of fly ash will absorb AE water reducing agent etc., and will reduce the workability of the concrete. And, at the time of placing of the concrete, unburned carbon comes floating and there is harmful influence of a black part occurring in the connecting portion of the concrete. Further, when there was much unburned carbon of fly ash, there was also a problem that the quality of an artificial lightweight aggregate deteriorated. Therefore, only fly ash with little unburned carbon was used for the materials of cement etc., and the fly ash with high unburned carbon content could not be used effectively and was processed for reclamation as industrial waste.

In order to remove unburned carbon from fly ash of high-unburned carbon content and to effectively use them, in the first patent document, a method for removing unburned carbon from fly ash is described. This method comprises the steps of: adding water to fly ash to produce slurry; adding collector to the slurry; feeding the slurry and the collector to a submerged agitator having a rotation shaft penetrating a cylindrical main body in an axial direction thereof, plurality of chambers formed by dividing an inside of the main body in the axial direction thereof and an agitating vane fixed to the rotation shaft and rotating in each chamber to add shearing force to the slurry and collector; adding frother to the slurry and collector; agitating them to generate air bubbles; and adhering unburned carbon of the fly ash to the air bubbles to raise the unburned carbon.

With this method, by adding shearing force to original fly ash slurry, which contains unburned carbon and to which collector is added before flotation process, unburned carbon content of the fly ash can considerably reduced, and fly ash with approximately 0.5% of unburned carbon content can be obtained. In addition, generally used collector such as kerosene can be used in the above process, and the amount of collector used can be reduced, which allows little kerosene etc. to remain in the fly ash as a product and post-processing after the flotation process to be easy.

Patent document 1: Japanese Patent No. 3613347 gazette.

BRIEF SUMMARY OF THE INVENTION

However, in the above-mentioned conventional method for removing unburned carbon from fly ash, a comparatively large submerged agitator is used to add shearing force to fly ash slurry, which causes a problem of increased facility cost. In addition, generally, one submerged agitator as described above is installed to a system for removing unburned carbon, which causes another problem that it is difficult to adjust the required capacity of the system depending on property of fly ash.

The present invention has been made in consideration of the above problems, and the object thereof is to provide an apparatus and a method for suppressing facility cost and realizing stable performance adjustment depending on property of fly ash.

To achieve the above object, the present invention relates to an apparatus for removing unburned carbon from fly ash, and the apparatus is characterized by comprising: a static-type mixer or a pipe with a narrowed portion for adding shearing force to slurry including fly ash and collector; and a flotation machine for generating air bubbles while agitating the slurry and collector, to which the shearing force is added, and adhering unburned carbon of the fly ash to the air bubbles to raise the unburned carbon.

With this invention, by adding the shearing force to the slurry and the collector with a comparatively small static-type mixer without movable portions or the pipe with a narrowed portion; generating the air bubbles while agitating the slurry, the collector and the frother in the flotation machine; and adhering the unburned carbon of the fly ash to the air bubbles to raise the unburned carbon, facility cost can be suppressed to remove unburned carbon from fly ash.

In addition, the present invention relates to an apparatus for removing unburned carbon from fly ash, and the apparatus is characterized by comprising: a static-type mixer or a pipe with a narrowed portion for adding shearing force to slurry including fly ash, collector and frother; and a flotation machine for generating air bubbles while agitating the slurry, collector and frother, to which the shearing force is added, and adhering unburned carbon of the fly ash to the air bubbles to raise the unburned carbon. With this, like the invention described above, facility cost is suppressed to remove unburned carbon from fly ash.

In the above-mentioned apparatus for removing unburned carbon from fly ash, an air feeder for feeding air to the static-type mixer or the pipe with a narrowed portion can be installed. Introduction of the air to the static-type mixer or the like will make it possible that surface of unburned carbon is reformed with cavitation in the static-type mixer etc., and the introduced air can also be utilized as air for flotation in the flotation machine.

In the above apparatus for removing unburned carbon from fly ash, plurality of the static-type mixers or plurality of the pipes with narrowed portions can be arranged in series or/and in parallel. Increase or decrease of the number of the static-type mixers and the like arranged in series would realize stable performance adjustment even if property of the fly ash were changed. In addition, increase or decrease of the number of the static-type mixers or the like arranged in parallel would realize stable performance adjustment even if required capacity of the fly ash were changed.

In the above apparatus for removing unburned carbon from fly ash, plurality of the flotation machines can be arranged in series, and the static-type mixer or the pipe with a narrowed portion may be arranged between the flotation machines adjacent with each other. Repeated addition of the shearing force to the slurry and collector and repeated flotation can efficiently separate unburned carbon from fly ash.

The static-type mixer may comprise a guide vane chamber with plurality of guide vanes for converting fluid, which is fed to the chamber, to spiral flow, and a current cutter chamber with plurality of mushroom-shaped projections for adding shearing force to the fluid converted to spiral flow.

In addition, the pipe with a narrowed portion can be a venture pipe or an orifice pipe.

In addition, the present invention relates to a method for removing unburned carbon from fly ash, and the method is characterized by comprising the steps of: adding water to fly ash to produce slurry; adding collector to the slurry; feeding the slurry and collector to a static-type mixer or a pipe with a narrowed portion to add shearing force to the slurry and collector; adding frother to the slurry and collector to which shearing force is added; agitating the slurry, collector and frother to generate air bubbles; and adhering unburned carbon of the fly ash to the air bubbles to raise the unburned carbon.

With this invention, by adding shearing force to the slurry and the collector with a comparatively small static-type mixer without movable portions or the pipe with a narrowed portion; generating the air bubbles while agitating the slurry, the collector and the frother in the flotation machine; and adhering the unburned carbon of the fly ash to the air bubbles to raise the unburned carbon, facility cost can be suppressed.

Further, the present invention relates to a method for removing unburned carbon from fly ash, and the method is characterized by comprising the steps of: adding water to fly ash to produce slurry; adding collector and frother to the slurry; feeding the slurry, collector and frother to a static-type mixer or a pipe with a narrowed portion to add shearing force to the slurry, collector and frother; agitating the slurry, collector and frother to generate air bubbles; and adhering unburned carbon of the fly ash to the air bubbles to raise the unburned carbon. With this, like the invention described above, facility cost can be suppressed to remove unburned carbon from fly ash.

In the above methods for removing unburned carbon from fly ash, air can be introduced to the static-type mixer or the pipe with a narrowed portion to reform surface of unburned carbon with cavitation action in the static-type mixer etc., and the introduced air can also be utilized as air for flotation in the flotation machine.

In the above methods for removing unburned carbon from fly ash, depending on the change in property of the fly ash, the number of the static-type mixers or the pipes with narrowed portions in operation, which are arranged in series, can be increased or decreased. With this, even if property of the fly ash were changed, stable performance adjustment could be realized.

In the above methods for removing unburned carbon from fly ash, depending on required capacity for the fly ash, the number of the static-type mixers or the pipes with narrowed portions in operation, which are arranged in parallel, can be increased or decreased. With this, even if required capacity for the fly ash were changed, stable performance adjustment might be realized.

Further, in the above methods for removing unburned carbon from fly ash, lifetime of the static-type mixer or the pipe with a narrowed portion can be determined depending on pressure loss between positions upstream and downstream thereof. With this, conditions of abrasion at various potions of the static-type mixer or the pipe with a narrowed portion by abrasive fly ash particles can properly be grasped and maintenance of the system may suitably be performed.

As described above, with this invention, when removing unburned carbon from fly ash, increase of facility cost can be suppressed and stable performance adjustment depending on property of fly ash may be achieved. In addition, by the effect of producing new surface of fly ash particle, when the fly ash is added to cement and is hardened with the cement, the fly ash can be more solidly reacted with cement hydrate.

DETAILED DESCRIPTION OF THE INVENTION

Figure 1:
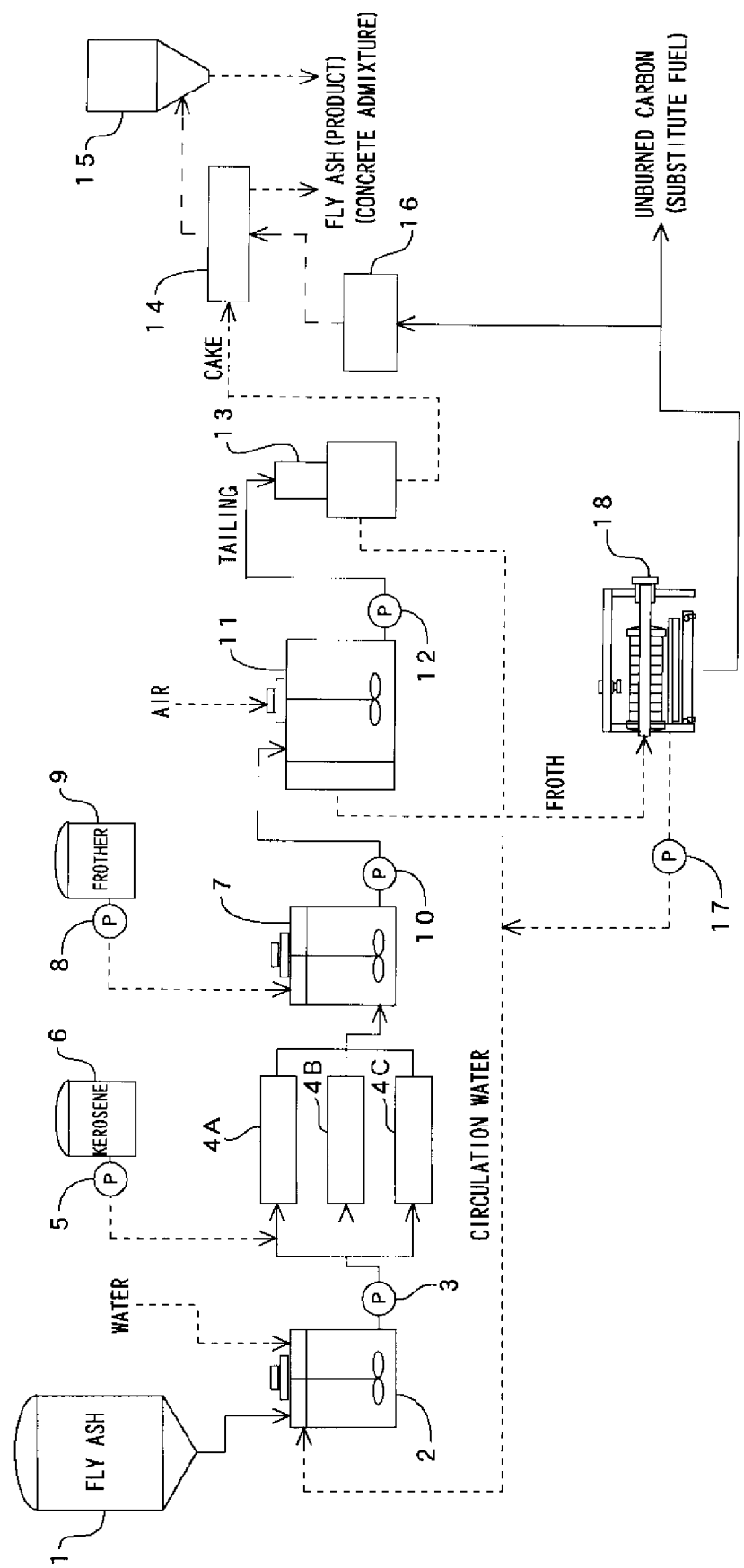
FIG. 1 is a flowchart showing an embodiment of the system to which an apparatus and a method for removing unburned carbon from fly ash according to the present invention is applied.

FIG. 1 shows an example of the system composition for enforcing an apparatus and a method for removing unburned carbon from fly ash according to the present invention, and the system roughly comprise a fly ash tank 1, a slurry tank 2 for adding water to fly ash fed from the fly ash tank 1 to generate slurry, a static-type mixers 4 (4A-4C) that apply shearing force to the slurry and a collector after adding the collector to the slurry to modify the surface of unburned carbon and so on, a flotation machine 11 that separates the unburned carbon by adding frother to the slurry, generating air bubbles, making the unburned carbon of fly ash adhere to the air bubbles and rise, a solid/liquid separator 13 for solid/liquid separating tailing from the flotation machine 11, a drier 14 for obtaining dried fly ash (product) by drying cake from the solid/liquid separator 13, a filter press 18 for solid/liquid separating froth from the flotation machine 11 to obtain unburned carbon, and so on.

The slurry tank 2 is installed to produce slurry from water and fly ash, and is provided with an agitating vane to agitate the slurry therein. At the upstream of the slurry tank 2, the fly ash tank 1 and a water supply equipment are installed, and at the downstream of the slurry tank 2, a pump 3 for transporting the slurry to the static-type mixers 4 is installed.

Figure 2:
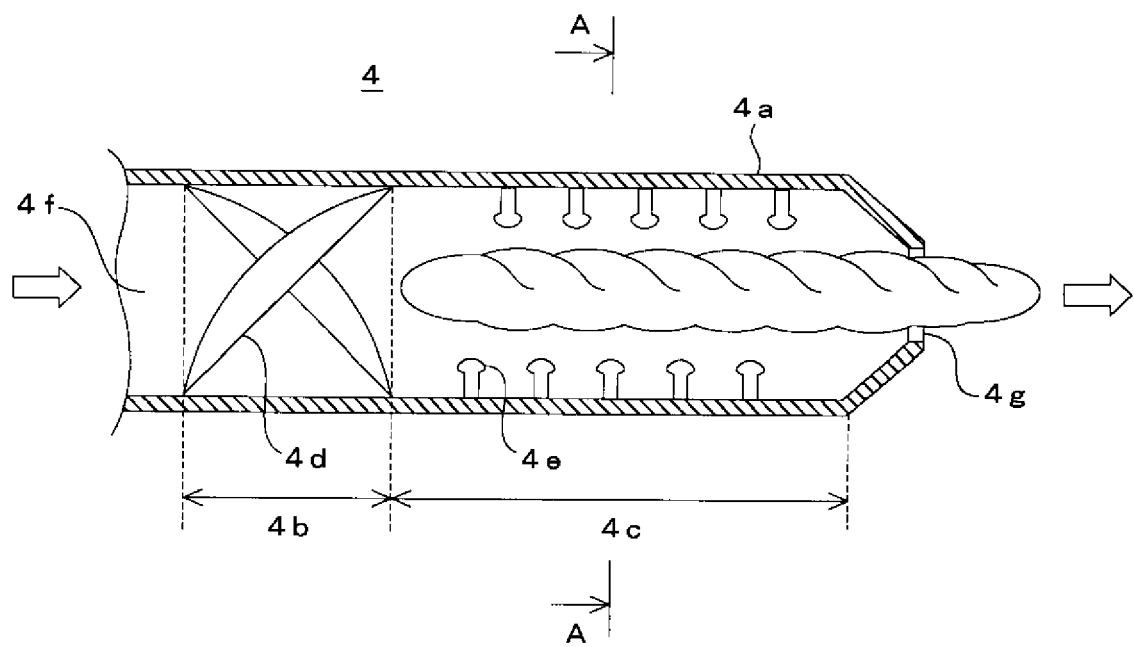
FIG. 2 is a drawing showing the OHR mixer as an example of a static-type mixer used for the apparatus for removing unburned carbon from fly ash according to the present invention, (a) is longitudinal sectional view, and (b) is transverse sectional view.
Figure 2:
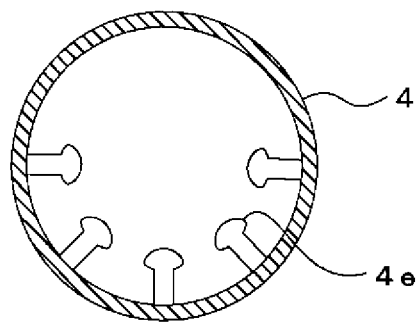

The static-type mixers 4 are installed to add shearing force to the slurry and the collector; to modify the surface of the unburned carbon; and to ultrafinely grind particles included in the slurry. As an example of the static-type mixer 4, there is a static-type mixer (OHR line mixer manufactured by Seika Co., Ltd.) shown in FIG. 2. A main body 4a of this static-type mixer 4 is separated into a guide vane chamber 4b and a current cutter chamber 4c. Plurality of guide vanes 4d are installed in the guide vane chamber 4b, and plurality of mushroom-shaped projections 4e are installed in the current cutter chamber 4c.

With the above-mentioned construction, two fluids entering to the guide vane chamber 4b from an entrance portion 4f are changed to spiral flows by the guide vanes 4d, which allow heavy material to move outward and light material to move inward through strong centrifugal force. The projections 4e in the current cutter chamber 4c turn an outer heavy-fluid layer and an inner light-fluid layer into superfine particle groups, and a micro particle group of the heavy fluid and a micro particle group of the light fluid are reacted with each other through consecutive and intensive collision.

In addition, as illustrated in FIG. 1, at the upstream of the static-type mixers 4 are installed a kerosene tank 6 for storing kerosene as the collector and a pump 5 for feeding the kerosene to the static-type mixers 4.

An adjustment tub 7 is installed to add frother supplied through a pump 8 from a frother tank 9 to the slurry and the collector from the static-type mixers 4, and to mix them with each other. The adjustment tub 7 is provided with an agitating vane therein. At the downstream of the adjustment 7 is arranged a pump 10 for transporting the slurry to the flotation machine 11.

The flotation machine 11 is installed to make the unburned carbon of fly ash adhere to air bubbles and to separate the fly ash into unburned carbon and fly ash from which unburned carbon was removed. Above the flotation machine 11 is installed an air supplying equipment for generating air bubbles. At the downstream of the flotation machine 11 is arranged a pump 12 for transporting tailing to the solid/liquid separator 13.

The solid/liquid separator 13 is installed to solid/liquid separate the tailing containing fly ash discharged from the flotation machine 11 and to divide the tailing into cake and water.

The drier 14 is installed to dry the cake supplied from the solid//liquid separator 13 with hot air from a hot air furnace 16, and the dried cake, that is, fly ash as product is used as a cement mixing material etc.

A bag filter 15 is installed to collect fine dust from the dryer 14, and the collected fine dust is also used as a cement mixing material etc.

The filter press 18 is installed to solid/liquid separate the froth containing unburned carbon from the flotation machine 11, and unburned carbon contained in the separated cake can be used as a fuel. Water discharged from the filter press 18 may be reused in the slurry tank 2 and the like through a pump 17.

The hot air furnace 16 is installed to feed hot air to the dryer 14. The unburned carbon discharged from the filter press 18 can be utilized for the drying.

Next, a method for removing unburned carbon from fly ash according to the present invention with the above-mentioned system will be explained with reference to FIG. 1 as a main drawing.

Fly ash is supplied to the slurry tank 2 from the fly ash tank 1 and is mixed with water to produce slurry. Here, fly ash concentration in the slurry is adjusted in the range from 3 to 50 weight percent.

Next, the slurry containing fly ash in the slurry tank 2 is supplied to the static-type mixers 4 through the pump 3. And, kerosene as a collector is supplied to the static-type mixers 4 through the pump 5 from the kerosene tank 6. Other than kerosene, generally used collectors such as light oil and heavy oil can be used. The amount of the collector added is adjusted from 5 to 100 weight percent of the amount of unburned carbon of fly ash.

Next, in the static-type mixers 4, to the slurry and the collector is added shearing force, and particles included in the slurry are ground ultrafinely. The process of adding shearing force and so on is a characterized portion of this invention. For example, the addition of shearing force and so on can be performed using the static-type mixer 4 shown in FIG. 2. In the static-type mixer 4, flows of the slurry and the collector supplied from the entrance portion 4f are changed into spiral flows by the guide vanes 4d in the guide vane chamber 4b; shearing force is added to the slurry and the collector; and particles included in the slurry are ultrafinely ground by the projections 4e in the current cutter chamber 4c. The slurry and the collector, to which shearing force is added, are discharged from an exit portion 4g, and are supplied to the adjustment tub 7.

As described above, adding fly ash slurry and collector and so on is performed to improve flotation separation performance by reforming the surface of the unburned carbon and others. With this, unburned carbon is adhered to the collector, and the unburned carbon, which is adhered to the collector, is adhered to the air bubbles to float. Like this, the flotation separation performance can be increased.

Next, as illustrated in FIG. 1, the froth containing unburned carbon discharged from the flotation machine 11 is solid/liquid separated by the filter press 18 to collect unburned carbon. Water departed from the filter press 18 can be supplied to the slurry tank 2 through the pump 17 so as to be added to new fly ash, or can be reused for erasing bubbles at the time of making unburned carbon adhere to air bubbles in the flotation machine 11.

On the other hand, the tailing containing fly ash from the flotation machine 11 is solid/liquid separated by the solid/liquid separator 13. When much water is contained in the cake, with the hot air obtained by burning the unburned carbon discharged from the filter press 18 in the hot air furnace 16, the cake is dried in the drier 14, and fly ash as product, of which unburned carbon content becomes 1 weight percent or less, can be used as a cement mixing material etc. Further, the fine dust collected by the bag filter 15 can also be used as a cement mixing material etc.

Meanwhile, besides the OHR mixer described above, as the static-type mixer 4, it is possible to use a device having a resistive element arranged in such a manner that two liner members thereof face with each other while gradually separating from each other downward under the condition that the elements are inclined downward, and a device for separating, reversing and mixing by a twist element.

In addition, in the embodiment described above, the frother is added to the adjustment tub 7 installed at the downstream of the static-type mixers 4 (4A-4C) to generate air bubbles during agitation, and in the flotation separator 11, to the air bubbles is adhered unburned carbon of fly ash to raise it. But, after the frother may be added together with slurry and kerosene as collector to the static-type mixers 4 (4A-4C), and shearing force can be added to them, air bubbles may be generated while agitating them in the adjustment tub 7, and in the flotation separator 11, to the air bubbles can be adhered unburned carbon of fly ash to raise it.

Figure 3:
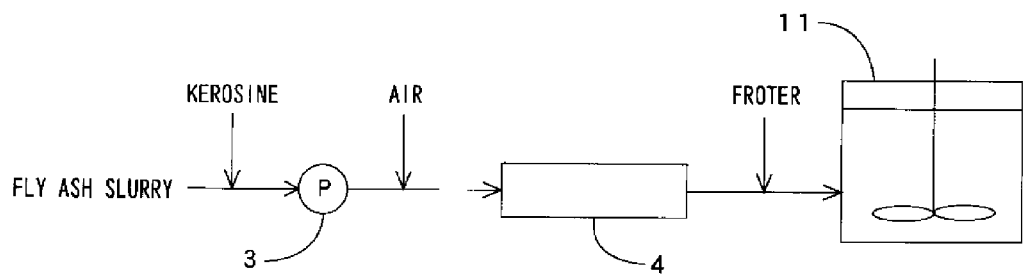
FIG. 3 is a flowchart showing an embodiment of the apparatus for removing unburned carbon from fly ash according to the present invention.

Further, since cavitation is apt to occur in the static-type mixer 4 such as OHR mixer, as illustrated in FIG. 3, introducing air into the static-type mixer 4 allows surface of unburned carbon is reformed with this cavitation, and the introduced air can also be utilized as air for flotation in the flotation machine 11.

Figure 4:
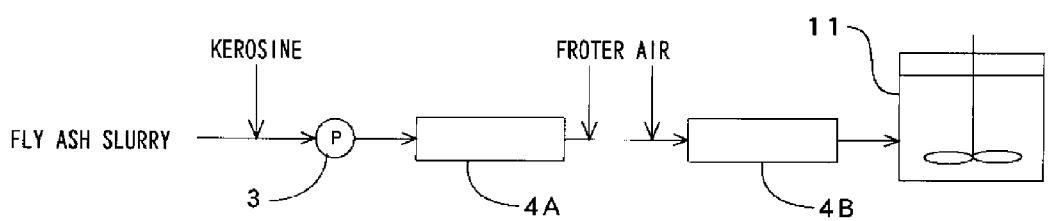
FIG. 4 is a flowchart showing another embodiment of the apparatus for removing unburned carbon from fly ash according to the present invention.

In addition, as illustrated in FIG. 4, the static-type mixers 4A, 4B are arranged in series in two stages, and air is introduced together with frother on the downstream side of the static-type mixer 4A, which allows the introduced air to be utilized as air used for flotation while further improving reforming effect of the surface of unburned carbon.

Figure 5:
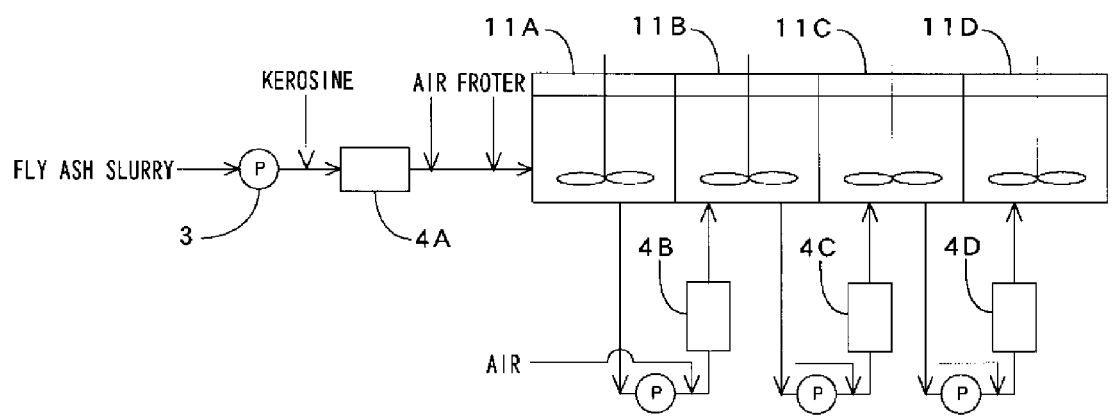
FIG. 5 is a flowchart showing another embodiment of the apparatus for removing unburned carbon from fly ash according to the present invention.

Further, as illustrated in FIG. 5, installing plurality of flotation machines 11A-11D and arranging static separators 4B, 4C and 4D between adjacent flotation machines to introduce tailing including fly ash from the flotation machines 11A-11D one after another cause shearing force to be added to the slurry and collector, and causes unburned carbon to efficiently be separated from fly ash. Here, there is no call for adding kerosene and frother to flotation machines 11B-11D and only air can be introduced thereto.

Next, as another example of the system composition for enforcing an apparatus and a method for removing unburned carbon from fly ash according to the present invention, the example using a pipe with a narrowed portion instead of a static-type mixer illustrated in FIG. 1 will be explained.

Figure 6:
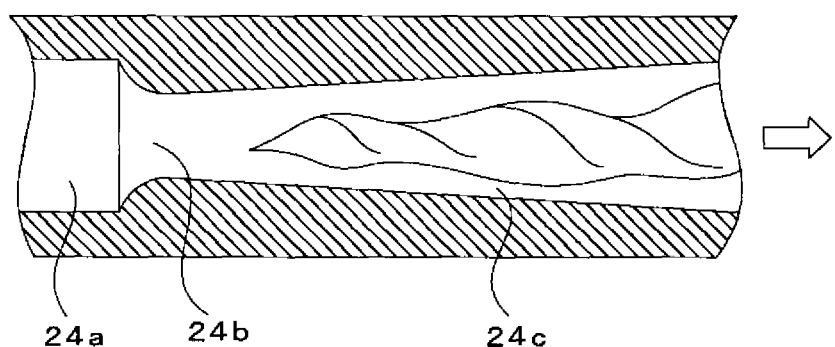
FIG. 6 is a sectional view showing a venture pipe as an example of a pipe with a narrowed portion used for the apparatus for removing unburned carbon from fly ash according to the present invention.

The pipe with a narrowed portion is, for example, as illustrated in FIG. 6, a venturi pipe 24 having a cylindrical pipe 24a and a pipe 24c, of which diameter gradually increases in the direction of slurry's flow indicated by the arrow, with the narrowed portion (waist portion) 24b as a border.

With this venturi pipe 24, flow velocity is accelerated when slurry and collector flow in the narrowed portion 24b, and pressure is decreased, and in the venturi pipe 24, the pressure increases concurrently with flow velocity of slurry and the like becomes low. Like this, since slurry and the like flowing in the venturi pipe 24 are subject to drastic pressure change, to the slurry and others is added sharing force, which allows particles included in the slurry and the like can be ultrafinely ground. In addition, flotation separation performance of unburned carbon can be improved through reformation of its surface and so on.

The pipe with a narrowed portion usable in the present invention is not limited to the venturi pipe 24 described above, but a pipe utilizing an orifice plate or the like may be used.

In addition, instead of the static-type mixer 4 shown in FIGS. 3-5, a pipe with a narrowed portion such as the venture pipe 24 can be used, and the venture pipe 24 realizes the same effect as the static-type mixer 4.

EXPLANATION OF REFERENCE NUMBERS 1 fly ash tank
2 slurry tank
3 pump
4 (4A-4D) static-type mixers
4a main body
4b guide vane chamber
4c current cutter chamber
4d guide vanes
4e projections
4f entrance portion
4g exit portion
5 pump
6 kerosene tank
7 adjustment tub
8 pump
9 frother tank
10 pump
11 (11A-11D) flotation machines
12 pump
13 solid/liquid separator
14 drier
15 bag filter
16 hot air furnace
18 filter press
24 venturi pipe
24a cylindrical pipe
24b narrowed portion
24c pipe This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one skilled in the art in view of this disclosure.

The invention claimed is:

1. An apparatus for removing unburned carbon from fly ash comprising:
   a shearing device for adding shearing force to slurry including fly ash and collector, said shearing device comprising a static-type mixer; and
   a flotation machine for generating air bubbles while agitating said slurry, collector and frother, to which the shearing force is added, and adhering unburned carbon of the fly ash to the air bubbles to raise said unburned carbon,
   wherein said static-type mixer comprises a tubular wall defining:
      a guide vane chamber with plurality of guide vanes for converting fluid, which is fed to the chamber, to spiral flow, and
      a current cutter chamber with plurality of mushroom-shaped projections extending radially inward from the tubular wall for adding shearing force to said fluid converted to spiral flow.

2. The apparatus for removing unburned carbon from fly ash as claimed in claim 1 further comprising an air feeder for feeding air to said shearing device.

3. The apparatus for removing unburned carbon from fly ash as claimed in claim 1 wherein a plurality of said shearing devices are arranged in series or/and in parallel.

4. The apparatus for removing unburned carbon from fly ash as claimed in claim 1 wherein a plurality of said flotation machines are arranged in series, and said shearing device is arranged between said flotation machines adjacent with each other.

5. The apparatus for removing unburned carbon from fly ash as claimed in claim 1, wherein the tubular wall is disposed about a center point, the projections extending only partially to the center point.

6. The apparatus for removing unburned carbon from fly ash as claimed in claim 1, wherein the tubular wall defines a radius and each projection defines a length less than the radius.

7. A method for removing unburned carbon from fly ash comprising the steps of:
   adding water to fly ash to produce slurry;
   adding collector to said slurry,
   adding shearing force to the slurry and collector by feeding said slurry and collector to a shearing device comprising a static-type mixer comprising a tubular wall, a guide vane chamber with plurality of guide vanes coupled to the tubular wall for converting fluid which is fed to the chamber to spiral flow, and a current cutter chamber with plurality of mushroom-shaped projections extending radially inward from the tubular wall for adding shearing force to said fluid converted to spiral flow;

adding frother to said slurry and collector to which shearing force is added;

agitating said slurry, collector and frother to generate air bubbles; and adhering unburned carbon of said fly ash to the air bubbles to raise said unburned carbon.

8. The method for removing unburned carbon from fly ash as claimed in claim 7 further comprising the step of introducing air to said shearing device.

9. The method for removing unburned carbon from fly ash as claimed in claim 7 further comprising the step of increasing or decreasing the number of the shearing devices in operation, which are arranged in series, depending on change in property of the fly ash.

10. The method for removing unburned carbon from fly ash as claimed in claim 7 further comprising the step of increasing or decreasing the number of the shearing devices in operation, which are arranged in parallel, depending on required capacity.

11. The method for removing unburned carbon from fly ash as claimed in claim 7 further comprising the step of determining lifetime of said shearing device depending on pressure loss between positions upstream and downstream thereof.

12. A method for removing unburned carbon from fly ash comprising the steps of:

adding water to fly ash to produce slurry;

adding collector and frother to said slurry;

adding shearing force to the slurry, collector and frother by feeding said slurry, collector and frother to a shearing device comprising a static-type mixer comprising a tubular wall, a guide vane chamber with plurality of guide vanes disposed within the tubular wall for converting fluid which is fed to the chamber to spiral flow, and a current cutter chamber with plurality of mushroom-shaped projections extending from the tubular wall for adding shearing force to said fluid converted to spiral flow;

agitating said slurry, collector and frother to generate air bubbles; and adhering unburned carbon of said fly ash to the air bubbles to raise said unburned carbon.

13. The method for removing unburned carbon from fly ash as claimed in claim 12 further comprising the step of introducing air to said shearing device.

14. The method for removing unburned carbon from fly ash as claimed in claim 12 further comprising the step of increasing or decreasing the number of the shearing devices in operation, which are arranged in series, depending on change in property of the fly ash, wherein at least one shearing device is maintained.

15. The method for removing unburned carbon from fly ash as claimed in claim 12 further comprising the step of increasing or decreasing the number of the shearing devices in operation, which are arranged in parallel, depending on required capacity, wherein at least one shearing device is maintained.

16. The method for removing unburned carbon from fly ash as claimed in claim 12 further comprising the step of determining lifetime of said shearing device depending on pressure loss between positions upstream and downstream thereof.

17. An apparatus for removing unburned carbon from fly ash comprising:

a shearing device comprising a static-type mixer for adding shearing force to slurry including fly ash, collector and frother; and a flotation machine for generating air bubbles while agitating said slurry, collector and frother, to which the shearing force is added, and adhering unburned carbon of the fly ash to the air bubbles to raise said unburned carbon;

wherein said static-type mixer comprises a tubular wall defining:

a guide vane chamber with plurality of guide vanes for converting fluid, which is fed to the chamber, to spiral flow, and a current cutter chamber with plurality of mushroom-shaped projections extending radially inward from the tubular wall for adding shearing force to said fluid converted to spiral flow.

* * * * *